(12) United States Patent
Blasco Serrano et al.

(10) Patent No.: US 10,805,971 B2
(45) Date of Patent: Oct. 13, 2020

(54) ALLOWANCE OF A SIDELINK COMMUNICATION OPERATION

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/073,832

(22) PCT Filed: Feb. 3, 2017

(86) PCT No.: PCT/EP2017/052400
§ 371 (c)(1),
(2) Date: Jul. 30, 2018

(87) PCT Pub. No.: WO2017/134235
PCT Pub. Date: Aug. 10, 2017

(65) Prior Publication Data
US 2019/0037622 A1    Jan. 31, 2019

Related U.S. Application Data

(60) Provisional application No. 62/291,622, filed on Feb. 5, 2016.

(51) Int. Cl.
*H04W 4/70* (2018.01)
*H04W 76/14* (2018.01)
(Continued)

(52) U.S. Cl.
CPC ............. *H04W 76/14* (2018.02); *H04W 4/70* (2018.02); *H04W 72/042* (2013.01); *H04W 92/18* (2013.01)

(58) Field of Classification Search
None
See application file for complete search history.

(56) References Cited

U.S. PATENT DOCUMENTS

2015/0043545 A1  2/2015  Cheng et al.
2017/0142741 A1*  5/2017  Kaur .................... H04W 72/02
(Continued)

FOREIGN PATENT DOCUMENTS

WO    WO 2015/143170 A1    9/2015

OTHER PUBLICATIONS

Notification of Transmittal of the International Search Report and the Written Opinion of the International Searching Authority for International Application No. PCT/EP2017/052400 dated May 4, 2017.

*Primary Examiner* — Kodzovi Acolatse
*Assistant Examiner* — The Hy Nguyen
(74) *Attorney, Agent, or Firm* — Patent Portfolio Builders, PLLC

(57) ABSTRACT

An apparatus determines, based on a radio resource control, RRC, state of a first UE and a transmission timing synchronization state of the first UE for a sidelink transmission of the first UE to a second UE, information indicating whether or not a sidelink communication operation of the first UE is allowed in a coverage area of a base station of a mobile communications network. The apparatus initiates provision of the information to the first UE. The apparatus obtains information indicating whether or not a sidelink communication operation of a first UE is allowed in a coverage area of a base station of a mobile communications network, the information being determined based on an RRC state of the first UE and a transmission timing synchronization state of (Continued)

the first UE for a sidelink transmission of the first UE to a second UE. The apparatus controls the first UE according to the information.

18 Claims, 5 Drawing Sheets

(51) Int. Cl.
*H04W 72/04* (2009.01)
*H04W 92/18* (2009.01)

(56) References Cited

U.S. PATENT DOCUMENTS

| | | | |
|---|---|---|---|
| 2017/0223708 A1* | 8/2017 | Jung | H04W 72/02 |
| 2017/0295553 A1* | 10/2017 | Lee | H04W 56/00 |
| 2018/0234928 A1* | 8/2018 | Yasukawa | H04W 4/70 |
| 2019/0037513 A1* | 1/2019 | Yang | H04W 76/10 |

* cited by examiner

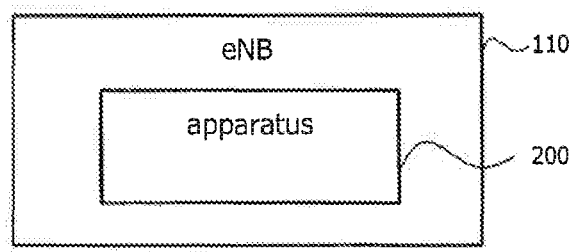

Fig. 3

300 determine, based on an RRC state of a first UE and a transmission timing synchronization state of the first UE for a sidelink transmission of the first UE to a second UE, information indicating whether or not a sidelink communication operation of the first UE is allowed in a coverage area of a base station of a mobile communications network — 310

Initiate provision of the information to the first UE — 320

| obtain information indicating whether or not a sidelink communication operation of a first UE is allowed in a coverage area of a base station of a mobile communications network, the information being determined based on an RRC state of the first UE and a transmission timing synchronization state of the first UE for a sidelink transmission of the first UE to a second UE | ~ 510 |

↓

| control the first UE according to the information | ~ 520 |

Fig. 7

ALLOWANCE OF A SIDELINK COMMUNICATION OPERATION

CROSS REFERENCE TO RELATED APPLICATIONS

This application is a 35 U.S.C. § 371 national stage application of PCT International Application No. PCT/EP2017/052400, filed on Feb. 3, 2017, which claims priority to U.S. Provisional Patent Application No. 62/291,622, filed on Feb. 5, 2016, the disclosures and content of which are incorporated by reference herein in its entirety.

TECHNICAL FIELD

The present disclosure generally relates to allowance of a sidelink communication operation. In particular a technique for determining whether or not a sidelink communication operation of a UE is allowed in a coverage area of a base station of a mobile communications network and informing the UE accordingly is presented. The technique may be practiced in the form of an apparatus, a base station, a method, a computer program, a computer readable storage medium and a system. Further presented is a technique for controlling a UE according to whether or not a sidelink communication operation is allowed in a coverage area of a base station of a mobile communications network. The technique may be practiced in the form of an apparatus, a user equipment, a method, a computer program, a computer readable storage medium and a system.

BACKGROUND

During Release 12, the LTE (Long-Term Evolution) standard has been extended with support of device to device (D2D) (specified as "sidelink") features targeting both commercial and public safety applications. In the D2D/sidelink case, devices exchange control and data directly with each other, without passing via the network infrastructure. Some applications enabled by Rel-12 LTE are device discovery, where devices are able to sense the proximity of another device and associated application by broadcasting and detecting discovery messages that carry device and application identities. Another application comprises direct communication based on physical channels terminated directly between devices. The enabling of sidelink communication impacts mobile communication resources such as network infrastructure resources, radio resources and user equipment resources.

SUMMARY

There is a need for techniques that address the impact of sidelink communication on mobile communication resources, which is crucial to meeting quality of service needs with the available resources.

According to a first aspect, an apparatus is presented. The apparatus is configured to determine, based on a radio resource control (RRC) state of a first user equipment (UE) and a transmission timing synchronization state of the first UE for a sidelink transmission of the first UE to a second UE, information indicating whether or not a sidelink communication operation of the first UE is allowed in a coverage area of a base station of a mobile communications network. The apparatus is further configured to initiate provision of the information to the first UE.

For instance, the apparatus may comprise at least one processor and at least one memory including computer program code. Therein, the computer program code is configured to control the at least one processor to determine, based on an RRC state of a first UE and a transmission timing synchronization state of the first UE for a sidelink transmission of the first UE to a second UE, information indicating whether or not a sidelink communication operation of the first UE is allowed in a coverage area of a base station of a mobile communications network. The computer program code is further configured to control the at least one processor to initiate provision of the information to the first UE. The at least one processor and the at least one memory may be arranged at a common location, e.g. within a common casing. They may however also be arranged in a distributed manner, e.g. in a cloud computing environment or a virtualized computing environment.

According to a second aspect, a base station for a mobile communications network comprising an apparatus according to the first aspect is presented.

According to a third aspect, a method is presented. The method comprises determining, based on an RRC state of a first UE and a transmission timing synchronization state of the first UE for a sidelink transmission of the first UE to a second UE, information indicating whether or not a sidelink communication operation of the first UE is allowed in a coverage area of a base station of a mobile communications network. The method further comprises initiating provision of the information to the first UE. The method may be performed by at least one apparatus. For instance, at least some of the actions according to the method may be performed by an apparatus installed in the base station.

According to a fourth aspect, a computer program is presented. The computer program comprised computer program code, that, when executed by a processor, causes an apparatus to perform the actions of the method according to the third aspect.

According to a fifth aspect, a computer readable storage medium in which such computer program code is stored is disclosed. The computer readable storage medium may be a non-transitory, tangible storage medium. The computer readable storage medium may, for instance, comprise a semiconductor memory, a hard disk, a CD-ROM or a DVD. The computer program according to the fourth aspect may also be provided for download, e.g., via a network connection.

According to a sixth aspect, an apparatus is presented. The apparatus is configured to obtain information indicating whether or not a sidelink communication operation of a first UE is allowed in a coverage area of a base station of a mobile communications network, the information being determined based on an RRC state of the first UE and a transmission timing synchronization state of the first UE for a sidelink transmission of the first UE to a second UE. The apparatus is further configured to control the first UE according to the information.

For instance, the apparatus according to the sixth aspect may comprise at least one processor and at least one memory including computer program code. Therein, the computer program code is configured to control the at least one processor to obtain information indicating whether or not a sidelink communication operation of a first UE is allowed in a coverage area of a base station of a mobile communications network, the information being determined based on an RRC state of the first UE and a transmission timing synchronization state of the first UE for a sidelink transmission of the first UE to a second UE. The computer program code is further configured to control the first UE according to the information. The at least one processor and the at least one memory may be arranged at a common location, e.g. within a common casing. They may however also be arranged in a distributed manner, e.g. in a cloud computing environment or a virtualized computing environment.

According to a seventh aspect, a user equipment comprising an apparatus according to the sixth aspect is presented.

According to an eighth aspect, a method is presented. The method comprises obtaining information indicating whether or not a sidelink communication operation of a first UE is allowed in a coverage area of a base station of a mobile communications network, the information being determined based on an RRC state of the first UE and a transmission timing synchronization state of the first UE for a sidelink transmission of the first UE to a second UE. The method further comprises controlling the first UE according to the information. The method may be performed by at least one apparatus. For instance, at least some of the actions according to the method may be performed by an apparatus installed in the first UE.

According to a ninth aspect, a computer program is presented. The computer program comprised computer program code, that, when executed by a processor, causes an apparatus to perform the actions of the method according to the eighth aspect.

According to a tenth aspect, a computer readable storage medium in which such computer program code is stored is disclosed. The computer readable storage medium may be a non-transitory, tangible storage medium. The computer readable storage medium may, for instance, comprise a semiconductor memory, a hard disk, a CD-ROM or a DVD. The computer program according to the eight aspect may also be provided for download, e.g., via a network connection.

According to an eleventh aspect, a system comprising a base station according to the second aspect and a user equipment according to the seventh aspect is presented.

In the following description, for the sake of conciseness focus is put on the apparatus according to the first aspect. The given explanations, however, correspondingly apply to the other aspects. Generally speaking, explanations given with respect to one aspect correspondingly apply to the other aspects. Also, while some explanations given below relate to an LTE implementation, no limitation to LTE implementations is intended and implementations in other mobile communication networks environments, e.g. a network according to the Universal Mobile Telecommunications System (UMTS) standard, which is a standard for the third generation of mobile telecommunications technology (3G), or a fifth generation (5G) network, are possible. Accordingly, terms such as user equipment or base station are not to be construed as relating to devices for use in a specific type of mobile communication network, but rather represent corresponding entities for use in various mobile communications networks. For instance, the base station may also be referred to as a NodeB or as an eNodeB (eNB). Likewise, a user equipment may for instance also be referred to as a user terminal in the context of the present disclosure.

The first UE may be associated to one of several radio resource control (RRC) states. For example, in an LTE implementation, the IDLE and CONNECTED states are defined. Additional states are being considered for LTE as well as 5G, such as a dormant state where the first UE maintains only some of the CONNECTED state functionalities. An IDLE UE may receive some downlink (DL) signals from the eNB but be unable to establish a data connection with the network (NW). Also, mobility functionalities may be limited and the NW may not have a valid RRC context of the first UE, which is necessary to establish a data connection. On the contrary, a UE in RRC CONENCTED is able to communicate with the NW and the mobility is supported.

A state machine and associated radio procedures may be defined for switching to between RRC states as a function of e.g. availability of data in the UE or in the NW. In an implementation, the eNB may signal a parametrization of the state machine to the first UE.

For sidelink communication, two different resource allocation methods are defined in LTE D2D. First, according to mode-1, a UE requests radio resources to the eNB for a given data transmission and the eNB grants a corresponding set of radio resources. In order to use mode-1, the UE must first switch to the RRC CONNECTED state in order to be able to exchange control information with the eNB. Second, according to mode-2, the eNB grants a set of radio resources that a UE may use in case it is interested in performing sidelink transmissions. The resources do not need to be requested by the UE and they may even be commonly granted (configured) by the eNB for a group of UEs. Therefore, the UE may use mode-2 in any RRC state.

The number of RRC CONNECTED devices that an eNB is able to support per cell is limited by hardware and product limitations. Keeping UEs in RRC CONNECTED puts high demands on the NW and especially on the eNB in terms of memory and processing. Furthermore CONNECTED UEs determine additional control signalling in the NW and the maximum number of practically supported CONNECTED UEs in a cell is limited. However, the inventors expect CONNECTED UEs to experience improved sidelink performance thanks to tighter eNB control, e.g. example for scheduling and resource allocation.

In synchronous communication systems (e.g. Global System for Mobile Communications (GSM), 3G, LTE, etc.), it is necessary that transmitter and receiver share a common time reference, up to a certain precision. For example, synchronous systems based on orthogonal-frequency-division multiplexing (OFDM) signals, such as LTE, are usually designed under the assumption that transmitter and receiver have time references whose difference does not exceed the duration of the (OFDM) cyclic prefix in order to allow the receiver to correctly place its sampling window and reduce inter-carrier interference. Different ways to establish this common timing reference exist.

The inventors have identified two contrasting needs: on one hand managing UE RRC states in a mobile communications network, e.g. limiting the number of CONNECTED UEs, and on the other hand controlling timing and resource allocation.

By determining, based on a radio resource control state of the first and a transmission timing synchronization state of the first UE, information indicating whether or not a sidelink communication operation of the first UE is allowed in a coverage area of a base station of a mobile communications network and initiating provision of the information to the first UE, sidelink communication allowance for the first UE may be controlled according to its RRC state and its transmission timing synchronization state. On the other hand, an apparatus according to the sixth aspect, e.g. forming part of the first UE, may then obtain the information indicating whether or not a sidelink communication operation of the first UE is allowed in a coverage area of the base station and may control the first UE according to the information.

For instance, in a proposed synchronization state where the first UE is synchronized (directly or indirectly via other UEs) to an external sync source such as a global navigation satellite system (GNSS), the apparatus according to the first aspect may determine that a sidelink communication operation of the first UE is allowed in a coverage area of the base station, e.g. an eNB, for both the case of the first UE's RRC state being the IDLE state and for the case of the first UE's RRC state being the CONNECTED state. Accordingly determined information indicating allowance of a sidelink communication operation may thus be determined and the provision of this information to the first UE may be initiated. Similar to the above-described mode-2, a grant of a set of radio resources that the first UE may use in case it is interested in performing a sidelink communications operation, e.g. a sidelink transmission to the second UE, may also be indicated. The sidelink communications operation may then be performed by the first UE without the need to obtain an explicit grant from the base station for that operation once it intends to perform it, i.e. the UE may be controlled according to the information to perform the sidelink communications operation using the previously granted set of radio resources. However, in the context of the presently discussed example, if the UE is not synchronized (directly or indirectly via other UEs) to a timing reference source external to the mobile communications network such as GNSS, the base station may prevent the first UE from using radio resources for a sidelink communication operation unless the UE switches to its RRC state to connected mode. Thus, the mobile communications network may for instance be relieved from the need to maintain a valid timing advance (TA) for UEs that anyway have accurate synchronization, while preserving the principle that UEs without accurate synchronization must synchronize to the mobile communications network.

Both the first UE and the second UE may be any type of UE, e.g. any type of mobile terminal. For instance, the UE may be a smartphone, a mobile computing device, e.g., a notebook or tablet computer, or a portable gaming device. In an implementation, at least one of the first UE and the second UE is a vehicle installed UE. Communication wherein at least one of two communicating UEs is a vehicle installed UE is also referred to as V2x communication, wherein 'V' stands for vehicle and 'x' represents any other UE, i.e. a vehicle installed UE or a UE not installed in a vehicle (vehicle-to-anything-you-can-image). V2x communication covers any combination of direct communication between vehicles, pedestrians and infrastructure. Variations of V2x communications thus include sidelink communication between a vehicle installed UE and a pedestrian's UE (vehicle-to-pedestrian, V2P), sidelink communication between a vehicle installed UE and another vehicle installed UE (vehicle-to-vehicle, V2V) as well as communication between a vehicle installed UE and infrastructure (vehicle-to-infrastructure, V2I). V2x communication may take advantage of a mobile communications network infrastructure when available. Yet, in some implementations, at least basic V2x connectivity may be possible even in case of lack of coverage. Providing an LTE-based V2x interface may be economically advantageous because of the LTE economies of scale and it may enable tighter integration between V2I, V2P and V2V communications, as compared to using a dedicated V2x technology. V2x communications may carry both non-safety and safety information, where each of the applications and services may be associated with specific requirements sets, e.g., in terms of latency, reliability, capacity, etc. ETSI has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM message may also serve as active assistance to safety driving for normal traffic. The availability of a CAM message is indicatively checked for every 100 ms, yielding a maximum detection latency requirement of <=100 ms for most messages. However, the latency requirement for pre-crash sensing warning is 50 ms. The DENM message is event-triggered, such as by braking, and the availability of a DENM message is also checked for every 100 ms, and the requirement of maximum latency is <=100 ms. The package size of CAM and DENM message varies from 100+ to 800+ bytes and the typical size is around 300 bytes. The message is supposed to be detected by all vehicles in proximity. The Society of the Automotive Engineers (SAE) also defined the Basic Safety Message (BSM) for dedicated short-range communications (DSRC) with various messages sizes. According to the importance and urgency of the messages, the BSMs are further classified into different priorities.

In V2x communication, the transmission timing may for instance be obtained by deriving a first time reference T1 and optionally offsetting it by a certain time offset T2. Options for T1 include timing derived from DL signals from a base station, e.g. an eNB, or another control node, timing derived from sidelink signals transmitted by another device, timing derived from a GNSS or equivalent external timing source, internal timing in a device, etc. Options for T2 include the timing advance (TA) typically configured by an eNB to align the signals received at the eNB, a timing advance compensating the propagation delay from eNB to the UE, no timing advance at all, some (configurable) offset which is not a function of the propagation delay, etc. Each of the above proposals have different advantages and disadvantages and different limitations in their applicability, depending e.g. on coverage of eNB, GNSS, devices and so on. No agreement on transmission timing implementation has been reached yet in 3GPP V2x standardization. Yet in view of the different advantages, disadvantages and limitations, it is anticipated by the inventors that possibly if not likely different timing protocols will coexist within the system, possibly even on the same time/frequency resources.

In V2x communications, the number of transmitting devices per coverage area, e.g. cell, is expected to be much larger than for cellular or typical sidelink services. Moreover, in V2x communications, a change in the timing protocol used by a UE (e.g. due to a loss of network or GNSS coverage, for instance because of a location change of the respective vehicle) may produce a timing misalignment between the UE and other nearby UEs. Accordingly, controlling sidelink communication allowance for the first UE according to its RRC state and its transmission timing synchronization state may be particularly beneficial.

Initiating provision of the information to the first UE may comprise at least one of initiating signalling of the information indicating whether or not the sidelink communication operation is allowed to the first UE and initiating configuration of the UE by the mobile communications network, optionally by RRC.

The apparatus according to the first aspect may be configured to initiate an indication of resources for a sidelink communication operation to the first UE. The apparatus may thus control which resources the first UE uses for a sidelink communication operation, e.g. a sidelink transmission to the second UE. As an example, the apparatus may be configured to initiate the indication in response to a sidelink communication operation resource request originating from the first UE. Thus, the sidelink communication resources may be indicated in an on demand manner, i.e. only in case of the first UE actually intending to perform a sidelink transmission to the second UE. Also, the apparatus may be configured to autonomously trigger the indication. Thus, the first UE may be provided with the indication without issuing a corresponding request and the indicated resources may then be used once the first UE intends to perform a sidelink transmission. While for issuing a sidelink communication operation resource request the RRC state of the first UE may have to be CONNECTED, by obtaining an indication autonomously provided to it, the first UE may perform a sidelink transmission to the second UE independent of its RRC state. The apparatus may be configured to choose, based on the RRC state of the first UE, between initiating the indication in response to a sidelink communication operation resource request originating from the first UE and autonomously triggering the indication.

The apparatus according to the first aspect may be configured to determine the information indicating whether or not a sidelink communication operation is allowed based on a mode of resource indication for the sidelink communication operation. For instance, the information may depend on whether the apparatus is configured to initiate the resource indication in response to a sidelink communication operation resource request originating from the first UE (base station, e.g. eNB, controlled resource usage) or configured to autonomously trigger the indication (UE autonomous resource usage), as described above. Alternatively or additionally, other modes of resource indication may also be considered.

The apparatus according to the first aspect may be configured to perform resource allocation for the sidelink communication operation based on the RRC state of the first UE and the transmission timing synchronization state of the first UE. The apparatus according to the first aspect of the present disclosure may also be configured to perform resource allocation for the sidelink communication operation based on the presence of a valid, e.g. recent, timing advance value in the first UE. For instance, RAN2 might introduce a submode of the RRC CONNECTED mode (dormant mode) where the first UE is still CONNECTED but it lacks a valid TA. In this case, resource usage of the first UE could then for instance be restricted.

The transmission timing synchronization state may at least be defined by a timing reference signal the first UE is configured to use. For instance, the timing reference signal may be one of a GNSS signal, a sidelink synchronization signal (SLSS), a downlink signal from the base station and a timing advance controlled by the base station. The first UE may be configured to use more than one timing reference signal, e.g. a combination of a downlink signal from the base station and a timing advance controlled by the base station. The timing reference signal may originate from a timing reference source external to the mobile communications network. To name but one example, the timing reference signal source may optionally be a GNSS. Employing a timing reference signal source external to the mobile communications network may relieve the network, e.g. the base station, from providing a timing reference signal for the first UE. At the same time, the first UE may obtain the timing reference signal even when it does not have network coverage. As explained above, use of different timing reference signals for different UEs may be enabled in the mobile communications network, e.g. in order to benefit from the different advantages provided by different timing protocols.

The mobile communication network may be configured to control the configuration of the first UE as to which timing reference signal to use. For instance, the base station may control UE configuration accordingly. In this case, the apparatus according to the first aspect of the present disclosure may be configured to cause the base station to control the configuration of the first UE as to which timing reference signal to use. Control of the first UE's timing reference signal configuration may require the first UE to be in the coverage area of the base station. As an example, the network may configure the source of timing to be used by UEs in coverage to ensure protection of other users, protection of time division duplex (TDD) deployments, etc.

The first UE may be configured to modify at least one of its RRC state and its transmission timing synchronization state in response to obtaining information indicating that a sidelink communication operation of the first UE is not allowed. Thus, the UE may react to a sidelink communication operation not being possible. For instance, the apparatus according to the first aspect of the present disclosure may be configured to cause the first UE to modify at least one of its RRC state and its transmission timing synchronization state in response to obtaining information indicating that a sidelink communication operation of the first UE is not allowed. As another option, the first UE may be configured to modify at least one of its RRC state and its transmission timing synchronization state autonomously in response to obtaining information indicating that a sidelink communication operation of the first UE is not allowed. Modifying the RRC state of the first UE may for instance comprise changing the RRC state to an RRC state in which, according to a rule used for determining the information, a sidelink communication operation of the first UE is allowed given the transmission timing synchronization state of the first UE. As an example, the RRC state may be changed from IDLE to CONNECTED. Additionally or alternatively, modifying the transmission timing synchronization state of the first UE may comprise changing the transmission timing synchronization state to a state in which, according to a rule used for determining the information, a sidelink communication operation of the first UE is allowed given the RRC state of the first UE. As an example, a timing reference signal the first UE is configured to use may be changed from a signal origination from a timing reference signal source within the mobile communications network, e.g. from a base station, to a signal origination from a timing reference signal source external to the mobile communications network.

The first UE may be configured to be controlled according to priority information, the priority information indicating at least one of an order of priority of RRC states to be assumed by the first UE for a sidelink communication operation and an order of priority of transmission timing synchronization states to be assumed by the first UE for a sidelink communication operation. Thus, for instance if at least one of an RRC state of the first UE or a transmission timing synchronization state of the first UE has to either initially selected or changed, e.g. due to a sidelink communication operation no being allowed for the present combination of RRC state and transmission timing synchronization state, the priority information may serve for indicating how to select or change the RRC state and/or transmission timing synchronization state. As another example, the priority information may indicate to which timing synchronization state to change if a current transmission timing synchronization reference signal becomes unavailable. For instance, a first UE using a reference signal origination from a GNSS may have to switch to another reference signal when it loses GNSS coverage so as to maintain a valid time reference. The order of priority of transmission timing synchronization states may be chosen so as to ensure service continuity in this case.

The apparatus according to the first aspect of the present disclosure may for instance be configured to determine the priority information dynamically. For instance, the priorities may be chosen based on UE capabilities, on the existence of cellular UEs, on TDD/frequency division duplex (FDD) configuration, etc. As another option, the priority information may be predefined, e.g. static. The apparatus according to the first aspect may be configured to initiate provision of the priority information to the first UE. Alternatively, the priority information may be prestored in the first UE.

The coverage area may be defined by at least one of a cell of the mobile communications network, e.g. a cell associated with the base station, and a geographic area.

The apparatus according to the first aspect of the present disclosure may be configured to determine the information indicating whether or not a sidelink communication operation is allowed based on at least one of a current and an expected number of UEs in the coverage area having a specific RRC state. As an example, the apparatus may adjust a rule used for determining the information at least based on the current or expected number of CONNECTED UEs in the coverage area or in the mobile communications network. If, for instance, the number of CONNECTED UEs exceeds a threshold, the apparatus may enable sidelink operation for the first UE if it is in the IDLE state, and vice-versa.

The apparatus according to the first aspect of the present disclosure may be configured to determine the information indicating whether or not a sidelink communication operation is allowed further based on a value of a radio measurement parameter, e.g. a radio measurement parameter associated with the first UE. As an example, the radio measurement parameter may be a radio signal received power (RSRP). In this context, if the first UE's RRC state is IDLE and the first UE's transmission timing synchronization reference signal is not a GNSS signal, for instance, sidelink operation may only be allowed if RSRP value measured for the first UE is below a certain threshold.

BRIEF DESCRIPTION OF THE DRAWINGS

Further aspects, details and advantages of the present disclosure will become apparent from the following description of exemplary embodiments and the drawings, wherein:

FIG. 3 schematically illustrates an embodiment of a base station according to the second aspect of the present disclosure, the base station comprising the apparatus of FIG. 2;

FIG. 4 is a flow diagram schematically illustrating an embodiment of a method according to the third aspect of the present disclosure;

FIG. 7 is a flow diagram schematically illustrating an embodiment of a method according to the eighth aspect of the present disclosure.

DETAILED DESCRIPTION

In the following description of some embodiments, for purposes of explanation and not limitation, specific details are set forth in order to provide a thorough understanding of the technique presented herein. It will be apparent to one skilled in the art that the technique presented herein may be practiced in other embodiments that depart from these specific details. For example, while the following embodiments will exemplarily be described in the context of an example LTE network environment and example apparatus implementations, it will be understood that embodiments may also be implemented in other network environments, e.g. a 5G network environment, and apparatus contexts.

Figure 1:
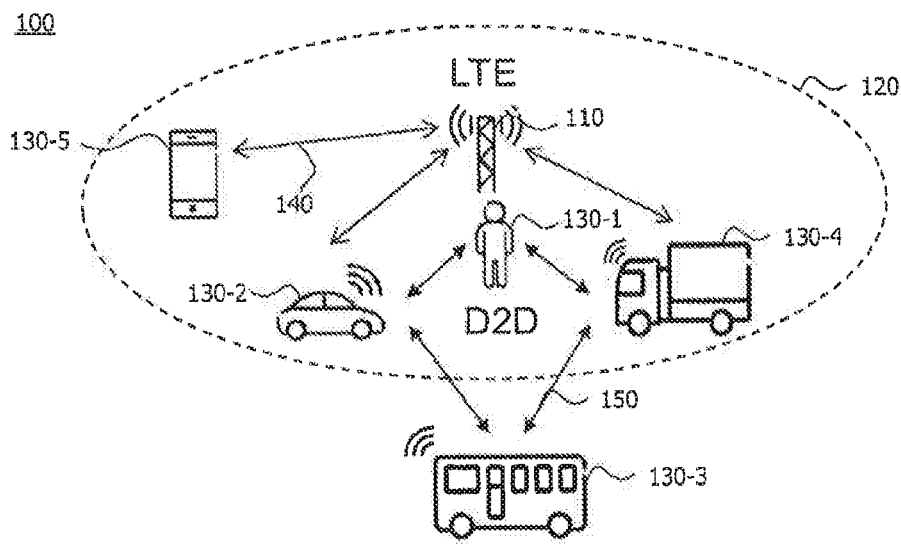
FIG. 1 schematically illustrates an environment in which embodiments of the present disclosure may be employed.

FIG. 1 schematically illustrates an environment in which embodiments of the present disclosure may be employed. As illustrated in FIG. 1, the environment comprises a mobile communications network 100, in the present example an LTE network. The network 100 comprises an eNB 110, which is an embodiment of a base station according to the second aspect of the present disclosure. eNB 110 provides mobile communication services in its coverage area 120. Coverage area 120 may for instance correspond to a cell associated with eNB 110 or it may be a geographically defined area. Several UEs 130-1 to 130-5, jointly denoted 130, are present in the environment. UE 130-1 is a UE carried by a pedestrian and is therefore represented by a pictogram showing a person. UEs 130-2 to 130-4 are vehicle installed UEs and are thus represented by a car, a bus and a truck respectively. Arrows 140 represent communication, e.g. control communication and/or payload communication, possibly taking place between UEs 130 and eNB 110. Arrows 150 represent sidelink communication (also referred to as device to device or D2D communication) possibly taking place between UEs 130-1 to 130-3 so that they exchange control information and payload data directly with each other without passing via infrastructure components of network 100 such as eNB 110. In FIG. 1, UE 130-5 is not shown participating in sidelink communication. However, this is not to indicate that it may not do so but rather to indicate that not all of the UEs in the environment have to participate in sidelink communication. Since UEs 130-2 to 130-4 are vehicle installed UEs, communication taking place between one of these UEs and another entity constitutes V2x communication, wherein 'V' stands for vehicle and 'x' represents the other entity. V2x communication includes any sidelink communication between the vehicle installed UE and the other UE as well as communication between a vehicle installed UE and infrastructure (vehicle-to-infrastructure, V2I). V2x does not imply any limitation as to the direction of the communication. For instance, it also covers transmission from another UE to a vehicle installed UE even if the other UE is not installed in a vehicle. In case of the other UE also being a vehicle installed UE, however, the V2x communication is vehicle-to-vehicle communication (V2V), e.g. communication between UE 130-2 and UE 130-3. Sidelink communication between UE 130-2 and pedestrian carried UE 130-1 constitutes vehicle-to-pedestrian (V2P) communication. V2x communication may carry both non-safety and safety information, such as CAMs, DENMs and BSMs. 15s Before explanations on actions performed by entities illustrated in FIG. 1 are provided, some apparatus embodiments are presented.

Figure 2:
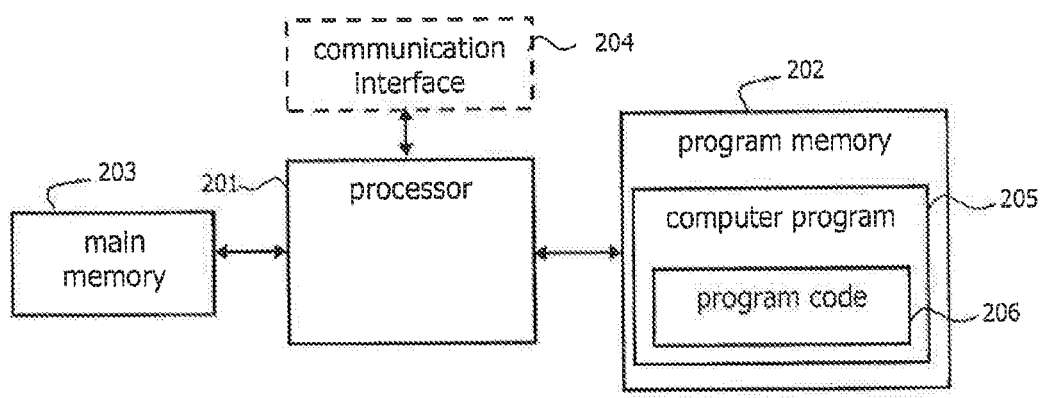
FIG. 2 schematically illustrates an embodiment of an apparatus according to the first aspect of the present disclosure, a computer program according to the fourth aspect of the disclosure and a computer readable storage medium according to the fifth aspect of the present disclosure.

FIG. 2 schematically illustrates an embodiment of an apparatus 200 according to the first aspect of the present disclosure, a 205 computer program according to the fourth aspect of the disclosure and a computer readable storage medium 202 according to the fifth aspect of the present disclosure.

Apparatus 200 comprises a processor 201. Processor 201 may represent a single processor or two or more processors, which are for instance at least partially coupled, for instance via a bus. Processor 201 interfaces with a program memory 202 and a main memory 203. Some or all of memories 202 and 203 may also be included into processor 201. One of or both of memories 202 and 203 may be fixedly connected to processor 201 or at least partially removable from processor 201, for instance in the form of a memory card or stick. Program memory 202 may for instance be a non-volatile memory. Examples of such tangible, non-volatile storage media include a FLASH memory, any of a ROM, PROM, EPROM and EEPROM memory or a hard disc, to name but a few examples. Program memory 202 may also comprise an operating system for processor 201. Main memory 203 may for instance be a volatile memory. It may for instance be a RAM or DRAM memory, to give but a few non-limiting examples. It may for instance be used as a working memory for processor 201 when executing an operating system and/or programs. Optionally, apparatus 200 may further comprise a communication interface 204 (or several communication interfaces) controlled by processor 201 and configured to receive and transmit signals. By means of communication interface 204, apparatus 200 may for instance communicate with a UE, such as any of UEs 130 in the environment of FIG. 1. Communication interface 204 may for instance comprise circuitry such as modulators, filters, mixers, switches and/or one or more antennas to allow transmission and/or reception of signals.

In program memory 202, a computer program 205 comprising computer program code 206 is stored. When executed by processor 201, computer program code 206 causes apparatus 200 to perform an embodiment of a method according to the third aspect of the present disclosure (e.g., as exemplified in FIG. 4 discussed below). Computer program 205 is thus an embodiment of a computer program according to the fourth aspect of the present disclosure and program memory 202 is thus an embodiment of a tangible, non-transitory, non-volatile computer readable storage medium according to the fifth aspect of the present disclosure. When program code 206 is executed by processor 201, apparatus 200 then inter alia determines, based on an RRC state of a first UE (e.g. one of UEs 130 of FIG. 1) and a transmission timing synchronization state of the first UE for a sidelink transmission of the first UE to a second UE (e.g. another one of UEs 130 of FIG. 1), information indicating whether or not a sidelink communication operation of the first UE is allowed in a coverage area of a base station (e.g. eNB 110 of FIG. 1) of a mobile communications network (e.g. mobile communications network 100 of FIG. 1). Apparatus 200 then further initiates provision of the information to the first UE.

All the components of apparatus 200 may be arranged at a common location, e.g. within a common casing. They may however also be arranged in a distributed manner, e.g. in a cloud computing environment or a virtualized computing environment, so that at least one of the components is arranged distant from at least one other of the components.

FIG. 3 schematically illustrates an embodiment of a base station according to the second aspect of the present disclosure, the base station comprising apparatus 200 of FIG. 2. The base station may for instance be the eNB 110 of FIG. 1 and is to thus denoted accordingly.

FIG. 4 is a flow diagram 300 schematically illustrating an embodiment of a method according to the third aspect of the present disclosure. Block 310 comprises determining, based on an RRC state of a first UE (e.g. one of UEs 130 of FIG. 1) and a transmission timing synchronization state of the first UE for a sidelink transmission of the first UE to a second UE (e.g. another one of UEs 130 of FIG. 1), information indicating whether or not a sidelink communication operation of the first UE is allowed in a coverage area of a base station (e.g. eNB 110 of FIG. 1) of a mobile communications network (e.g. mobile communications network 100 of FIG. 1). Block 320 comprises initiating provision of the information to the first UE.

Figure 5:
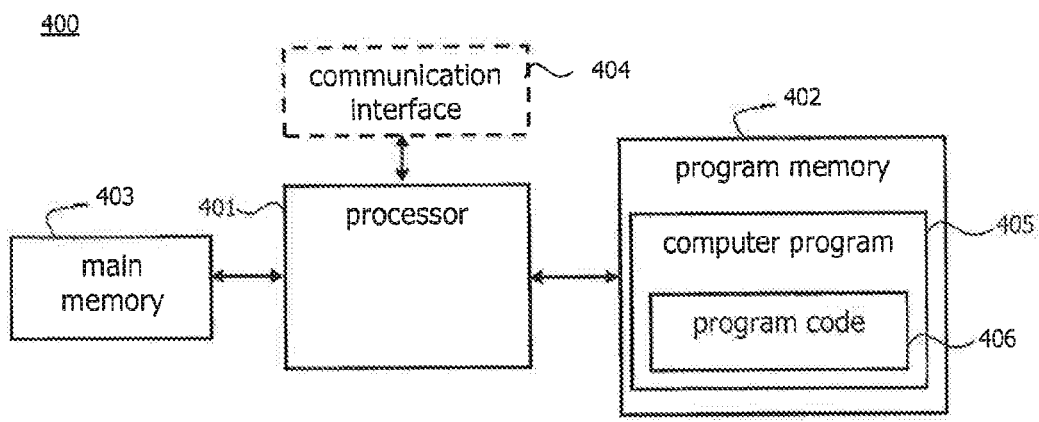
FIG. 5 schematically illustrates an embodiment of an apparatus according to the sixth aspect of the present disclosure, a computer program according to the ninth aspect of the disclosure and a computer readable storage medium according to the tenth aspect of the present disclosure.

FIG. 5 schematically illustrates an embodiment of an apparatus 400 according to the sixth aspect of the present disclosure, a computer program 405 according to the ninth aspect of the disclosure and a computer readable storage medium 402 according to the tenth aspect of the present disclosure. Structurally, apparatus 400 largely resembles apparatus 200 of FIG. 2. A detailed description of apparatus 400 is therefore omitted and focus is put on aspects differing from apparatus 200. All the components of apparatus 400 may be arranged at a common location, e.g. within a common casing. They may however also be arranged in a distributed manner, e.g. in a cloud computing environment or a virtualized computing environment, so that at least one of the components is arranged distant from at least one other of the components.

In program memory 402, a computer program 405 comprising computer program code 406 is stored. When executed by processor 401, computer program code 406 causes apparatus 400 to perform an embodiment of a method according to the eighth aspect of the present disclosure (e.g., as exemplified in FIG. 7 discussed below). Computer program 405 is thus an embodiment of a computer program according to the ninth aspect of the present disclosure and program memory 402 is thus an embodiment of a tangible, non-transitory, non-volatile computer readable storage medium according to the tenth aspect of the present disclosure. When program code 406 is executed by processor 401, apparatus 200 then inter alia obtains information indicating whether or not a sidelink communication operation of a first UE (e.g. one of UEs 130 of FIG. 1) is allowed in a coverage area of a base station (e.g. eNB 110 of FIG. 1) of a mobile communications network e.g. mobile communications network 100 of FIG. 1), the information being determined based on an RRC state of the first UE and a transmission timing synchronization state of the first UE for a sidelink transmission of the first UE to a second UE. Apparatus 400 then further controls the first UE according to the information. By means of communication interface 204, apparatus 200 may for instance communicate with a base station, such as eNB 110 of FIG. 1, e.g. to obtain the information indicating whether or not a sidelink communication operation of a first UE is allowed in coverage area 120 of a eNB 110.

Figure 6:
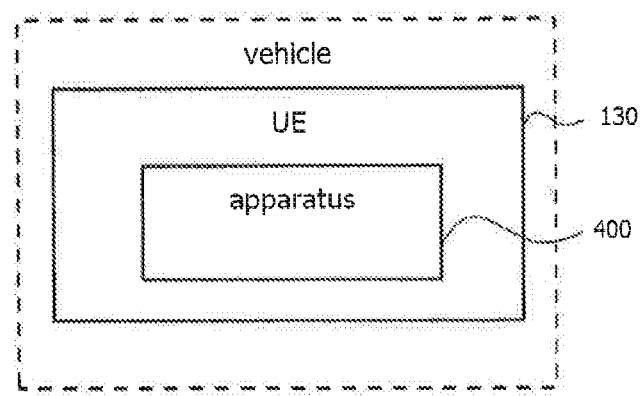
FIG. 6 schematically illustrates an embodiment of a user equipment according to the seventh aspect of the present disclosure, the user equipment comprising the apparatus of FIG. 5.

FIG. 6 schematically illustrates an embodiment of a UE according to the seventh aspect of the present disclosure, the UE comprising apparatus 400 of FIG. 5. The UE may for instance be one of UEs 130 of FIG. 1 and is thus denoted accordingly. The UE comprising apparatus 400 may be a vehicle installed UE like UEs 130-2, 130-3 and 130-4 of FIG. 1 or it may not be installed in a vehicle like UEs 130-1 and 130-5.

FIG. 7 is a flow diagram 500 schematically illustrating an embodiment of a method according to the eighth aspect of the present disclosure. Block 510 comprises obtaining information indicating whether or not a sidelink communication operation of a first UE (e.g. one of UEs 130 of FIG. 1) is allowed in a coverage area of a base station (e.g. eNB 110 of FIG. 1) of a mobile communications network (e.g. mobile communications network 100 of FIG. 1), the information being determined based on an RRC state of the first UE and a transmission timing synchronization state of the first UE for a sidelink transmission of the first UE to a second UE UE (e.g. another one of UEs 130 of FIG. 1). Block 520 comprises controlling the first UE according to the information.

Together eNB 110 of FIG. 1 and FIG. 3 and a UE 130 of FIG. 1 and FIG. 6 form an embodiment of a system according to the eleventh aspect of the present disclosure.

By means of the above-described embodiments sidelink communication allowance for the first UE may be determined and controlled according to its RRC state and its transmission timing synchronization state.

The table below provides an example summary of coverage and synchronization (timing) cases for a UE for V2V communications, supporting sidelink communications, such as one of UEs 130-2, 130-3 and 130-4 of FIG. 1, hereinafter referred to as UEs 130 for the sake of simplicity. In practice, some of the cases in the table may be merged and some other cases may be obtained by further splitting some of the rows. For example, the resources used by a UE in RRC states IDLE and CONNECTED do not necessarily need to be different. For example, the resources used by UEs with DL and GNSS timing do not necessarily need to be different. Cases 3 and 5 in the below table are new compared to legacy LTE releases.

| Case | Coverage | RRC state | Timing of sidelink transmissions | Sidelink configuration | Sidelink resource allocation (scheduling) |
|---|---|---|---|---|---|
| 1) | Out of eNB coverage | IDLE | Based on internal UE timing or external reference | Based on preconfiguration and possibly control information from other devices | Autonomous UE resource allocation within (pre)configured resources for out of coverage operation |
| 2) | Within eNB coverage | IDLE | Based on DL signals from eNB | At least partly from eNB | Autonomous UE resource allocation within (pre)configured resources for in-coverage operation of IDLE UEs with DL timing |
| 2bis) | | IDLE | Based on SLSS reference | At least partly from eNB | Autonomous UE resource allocation within (pre)configured resources for in-coverage operation of IDLE UEs with SLSS timing |
| 3) | | IDLE | Based on GNSS | At least partly from eNB | Autonomous UE resource allocation within (pre)configured resources for in-coverage operation of IDLE UEs with GNSS timing |
| 4) | | CONNECTED | Based on DL signals from eNB combined with TA at controlled by the eNB (explicit and autonomous timing corrections) | At least partly from eNB | eNB-controlled resource allocation Autonomous UE resource allocation within (pre)configured resources for in-coverage operation of CONNECTED UEs with DL timing |

-continued

| Case | Coverage | RRC state | Timing of sidelink transmissions | Sidelink configuration | Sidelink resource allocation (scheduling) |
|---|---|---|---|---|---|
| 5) | | CONNECTED | Based on GNSS | At least partly from eNB | eNB-controlled resource allocation Autonomous UE resource allocation within (pre)configured resources for in-coverage operation of CONNECTED UEs with GNSS timing |

Figure 8:
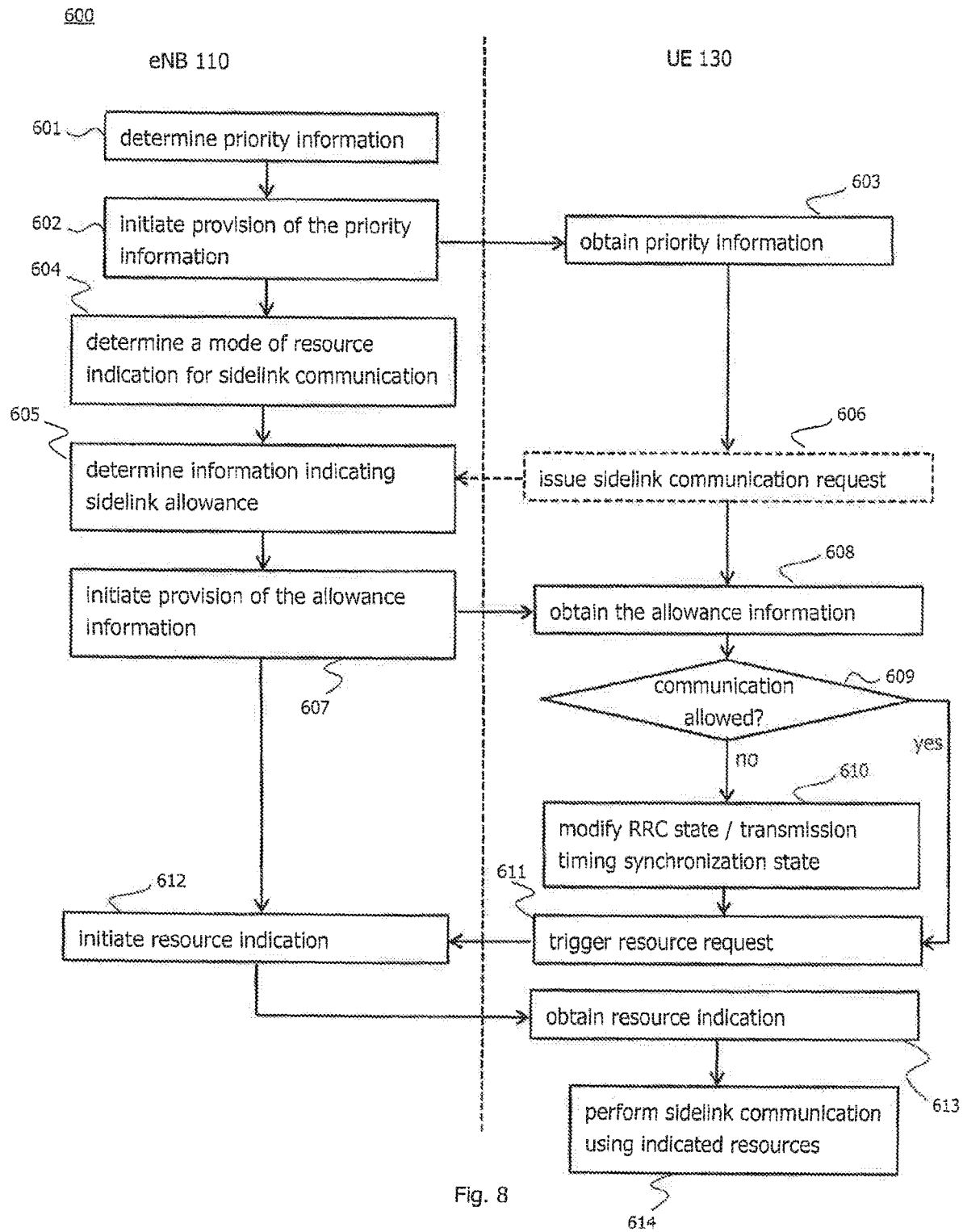
FIG. 8 is a flow diagram schematically illustrating another embodiment of a method according to the third aspect of the present disclosure and another embodiment of a method according to the eighth aspect.

FIG. 8 is a flow diagram 600 schematically illustrating another embodiment of a method according to the third aspect of the present disclosure and another embodiment of a method according to the eighth aspect. The method embodiments of FIG. 8 are explained with respect to the environment of FIG. 1 and with respect to the above table. On the left side of flow chart 600, actions perform by eNB 110 are presented, and on the right side actions of a vehicle installed UE 130 (first UE using the above terminology) are presented.

Block 601 comprises eNB 110 dynamically determining priority information, e.g. based on the existence of cellular UEs, on TDD/frequency division duplex (FDD) configuration. The priority information prioritizes the cases of the above table, thus indicating an order of priority of RRC states to be assumed by UE 130 for a sidelink communication operation, e.g. a sidelink transmission to another UE 130, and at the same time an order of priority of transmission timing synchronization states to be assumed by UE 130 for a sidelink communication operation, since in the cases of the table RRC states and transmission timing synchronization states are associated. Thereafter, eNB 110 initiates provision of the priority information to UE 130, e.g. transmission of the priority information (block 602). In block 603, UE 130 obtains, e.g. receives, the priority information. As an alternative, the priority information may be prestored in eNB 110 so that block 601 may be omitted or even prestored in UE 130 so that blocks 601 to 603 may both be omitted.

Block 604 comprises eNB 110 determining a mode of resource indication, i.e. eNB 110 chooses how resources for a sidelink communication operation of UE 130 are indicated to UE 130. eNB 110 may either autonomously trigger resource indication or may initiate the indication in response to a sidelink communication operation resource request originating from UE 130. Determination of a resource indication mode may be performed based on the RRC state of the UE 130. For instance, for the case of UE 130 being IDLE, sidelink communication resources may have to be indicated in advance so that once UE 130 intends to perform a sidelink transmission, it may do so in the IDLE state within previously indicated resources (see in particular cases 2, 2bis) and 3) in the above table).

Block 605 comprises eNB 110 determining, at least based on an RRC state and a transmission timing synchronization state of UE 130, information indicating whether or not a sidelink communication operation of UE 130 is allowed in coverage area 120 of eNB 110. This may either occur in response to a request from UE 130 to perform sidelink communication, e.g. a sidelink transmission, (optional block 606) or be triggered autonomously by eNB 110.

The determination of the allowance information in block 605 is performed according to a set of rules. For example, eNB 110 may allow a sidelink communication operation for UE 130 only if its RRC state is CONNECTED or if its RRC state is IDLE and it uses GNSS-based synchronization (thus cases 2 and 2bis in the above table would not allow sidelink communication). If UE 130 is not synchronized (directly or indirectly via other UEs) to a timing reference source external to mobile communications network 100, such as GNSS, eNB 110 may prevent UE 130 from performing a sidelink communication operation unless it switches its RRC state to CONNECTED. Thus, network 100 may be relieved from the need to maintain a valid timing advance for UEs that anyway have accurate synchronization, while preserving the principle that UEs without accurate synchronization must synchronize to the mobile communications network. eNB 110 may further differentiate sidelink communication allowance according to different resource indication/allocation modes, e.g., UE autonomous, eNB-controlled etc. A rule used for determining the information may be adjusted based on at least one of a current and an expected number of UEs in the coverage area having a specific RRC state. As an example, if the number of CONNECTED UEs exceeds a threshold, sidelink operation may be enabled for UEs in RRC state IDLE. The determination of the allowance information may further be based on a value of a radio measurement parameter associated with UE 130 such as a RSRP. As an example, if the first UE's RRC state is IDLE and the first UE's transmission timing synchronization reference signal is not a GNSS signal (cases 2) and 2bis) in the above table), for instance, sidelink operation may only be allowed if RSRP value measured for UE 130 is below a certain threshold.

In block 607 eNB 110 initiates provision of the sidelink allowance information to UE 130, e.g. initiates signalling thereof to UE 130 or initiates corresponding configuration of UE 130, e.g. by RRC. Block 608 comprises UE 130 obtaining, e.g. receiving, the allowance information. In block 609, UE 130 then checks whether or not, according to the allowance information, it may perform a sidelink communication operation. If so, UE 130 initiates a sidelink communication operation resource request (block 611), e.g. sends the request to eNB 110. In response to the request, eNB 110 initiates indication of resources for a sidelink communication operation to UE 130 (block 612). The actual resources allocated may depend on the RRC state of UE 130, the transmission timing synchronization state of UE 130 and on the presence of a valid timing advance value in UE 130. UE 130 obtains the resource indication in block 613. In block 614, UE 130 then performs sidelink communication using the indicated resources, e.g. performs a sidelink transmission to another one of UEs 130, specifically one of vehicle installed UEs 130-2, 130-3 and 130-4 in the present example. In case of eNB 110 being configured to autonomously trigger resource indication, block 611 may be omitted and the provision of UE 130 with resource information may also be performed at another point, for instance before allowance information is provided to UE 130 by eNB 110 in step 607.

If it turns out in block 609 that, according to the allowance information, a sidelink communication operation of UE 130 is not allowed, in block 610 UE 130 modifies at least one of its RRC state and its transmission timing synchronization state. To this end, UE 130 may take into account a rule used in block 605 for determining the allowance information. As an example, for a given the transmission timing synchronization state of the UE 130, the UE may assume an RRC state for which a sidelink communication operation is allowed according to the rule for the given transmission timing synchronization state of the UE. Also, UE 130 may change its transmission timing synchronization state so that for its given RRC state side sidelink communication operation is allowed according to the rule. The UE's RRC state any transmission timing synchronization state may also both be changed to a combination of these states for which a sidelink communication operation is allowed according to the rule. For instance, if the RRC state of UE 130 is IDLE, it either changes to a synchronization state that allows IDLE sidelink operation (if possible) or it switches to CONNECTED state. UE 130 may for instance be made aware of the rule by providing it with decision criteria used by eNB 110 for determining if a sidelink communication operation is allowed. For instance, combinations of RRC states and transmission timing synchronization states in which sidelink communication is allowed may be indicated to UE 130. In the presently described embodiment, for modifying at least one of its RRC state and its transmission timing synchronization state, UE 130 takes into account the priority information obtained in block 603 to determine how to select or change the RRC state and/or transmission timing synchronization state. Having assumed an RRC state and a transmission timing synchronization state in which sidelink communication is allowed, the actions of blocks 611 to 614 are performed.

The action of block 610 may also be performed for other reasons than a determination in block 609 yielding that a sidelink communication operation is not allowed. For instance, the transmission timing synchronization state may be changed if a current transmission timing synchronization reference signal becomes unavailable or a new timing synchronization reference signal becomes available. For such a case, the priority information may indicate to which timing synchronization state to change. For instance, if UE 130 is in coverage area 120 of eNB 110 and uses a reference signal origination from a GNSS, it may have to switch to another reference signal when it loses GNSS coverage so as to maintain a valid time reference. The order of priority of transmission timing synchronization states may be chosen so as to ensure service continuity in this case. As another example, loss or acquisition of network coverage, e.g. leaving/entering coverage area 120, may also affect reference signal availability, e.g. eNB DL signals may become unavailable or available.

For example, in case UE 130 has been configured to prioritize GNSS timing (case 3 and 5 in the above table), if it temporarily loses GNSS coverage but is in RRC state CONNECTED, service continuity can be ensured by switching to case 4 in the above table. However, if its RRC state is IDLE (case 3), service continuity may not be ensured by switching to timing based on DL signals (case 2). Aligning timing based on DL signals and timing based on GNSS may not be possible for most common cell sizes. In case an in-coverage IDLE UE loses GNSS coverage, it may thus be better to switch to SLSS-based timing (case 2bis). SLSS signals transmitted by UEs with GNSS coverage will most likely allow the UE that just lost GNSS coverage to derive a compatible timing reference. It has also been observed that DL timing is likely to result in degraded system performance compared to timing based on GNSS or with eNB-controlled TA. UEs transmitting signals following the DL timing may be received with large time offsets at the eNB, possibly resulting in inter-symbol interference with other transmissions. Even when transmitting between devices (sidelink) the range of sidelink transmissions using DL timing is asymmetrical and largely depends on the timing assumptions of the receivers. On the other hand, it may be easier for sidelink receivers to detect sidelink transmissions independently of the distance of the transmitter from the eNB when such transmitters use e.g. GNSS-based timing or TA controlled by the eNB.

The above described embodiments enable controlling sidelink communication allowance for a UE according to its RRC state and its transmission timing synchronization state. A mobile communications network may thus be enabled to trade base station complexity, e.g. eNB complexity, for sidelink performance depending on the network load situation. In V2x communications, the number of transmitting devices per coverage area, e.g. cell, is expected to be much larger than for cellular or typical sidelink services and changes in the timing protocol used by a UE are expected to be relatively frequent so that RRC state and transmission timing synchronization state based sidelink communication allowance control may be particularly beneficial.

The present invention has been described with reference to exemplary embodiments. It will be apparent to one skilled in the art that the present invention can be implemented in various other embodiments. The present invention is thus only limited by the scope of the claims that follow.

The invention claimed is:

1. An apparatus comprising:
   a processor; and
   a memory storing program code executable by the processor to cause the apparatus to perform operations to:
   determine, based on a radio resource control (RRC) state of a first user equipment (UE) and a transmission timing synchronization state of the first UE for a sidelink transmission of the first UE to a second UE, information indicating whether or not a sidelink communication operation of the first UE is allowed in a coverage area of a base station of a mobile communications network, wherein the transmission timing synchronization state is defined by at least one timing reference signal that is used by the first UE for synchronization; and
   initiate provision of the information to the first UE,
   wherein the apparatus further configures the first UE to be controlled according to priority information, the priority information indicating an order of priority of RRC states to be assumed by the first UE for the sidelink communication operation and an order of priority of transmission timing synchronization states to be assumed by the first UE for the sidelink communication operation.

2. The apparatus of claim 1, wherein the apparatus is further configured to initiate an indication of resources for the sidelink communication operation to the first UE, and wherein the apparatus is configured to perform at least one of:
   initiation of the indication in response to a sidelink communication operation resource request originating from the first UE; and
   autonomous trigger of the indication.

3. The apparatus of claim 2, wherein the apparatus is configured to determine the information further based on a mode of resource indication for the sidelink communication operation.

4. The apparatus of claim 1, wherein the first UE is configured to modify at least one of the RRC state and the transmission timing synchronization state in response to obtaining information indicating that the sidelink communication operation of the first UE is not allowed.

5. A method comprising:
   determining, based on a radio resource control (RRC) state of a first user equipment (UE) and a transmission timing synchronization state of the first UE for a sidelink transmission of the first UE to a second UE, information indicating whether or not a sidelink communication operation of the first UE is allowed in a coverage area of a base station of a mobile communications network, wherein the transmission timing synchronization state is defined by at least one timing reference signal that is used by the first UE for synchronization; and
   initiating provision of the information to the first UE,
   wherein an apparatus configures the first UE to be controlled according to priority information, the priority information indicating an order of priority of RRC states to be assumed by the first UE for the sidelink communication operation and an order of priority of transmission timing synchronization states to be assumed by the first UE for the sidelink communication operation.

6. The method of claim 5, wherein the method further comprises initiating an indication of resources for the sidelink communication operation to the first UE, and
   wherein the method comprises at least one of:
      initiating the indication in response to a sidelink communication operation resource request originating from the first UE; and
      autonomously triggering the indication, wherein the triggering is optionally performed by the base station.

7. The method of claim 6, wherein the method comprises determining the information further based on a mode of resource indication for the sidelink communication operation.

8. The method of claim 5, wherein the method comprises the first UE modifying at least one of the RRC state and the transmission timing synchronization state in response to obtaining information indicating that the sidelink communication operation of the first UE is not allowed.

9. A computer program product comprising a non-transitory computer-readable medium storing computer program code, the computer program code when executed by a processor causing an apparatus to perform the actions of the method of claim 5.

10. An apparatus comprising:
    a processor; and
    a memory storing program code executable by the processor to cause the apparatus to perform operations to:
    obtain information indicating whether or not a sidelink communication operation of a first user equipment (UE) is allowed in a coverage area of a base station of a mobile communications network, the information being determined based on a radio resource control (RRC) state of the first UE and a transmission timing synchronization state of the first UE for a sidelink transmission of the first UE to a second UE, wherein the transmission timing synchronization state is defined by at least one timing reference signal that is used by the first UE for synchronization; and
    control the first UE according to the information,
    wherein the apparatus is configured to control the first UE according to priority information, the priority information indicating an order of priority of RRC states to be assumed by the first UE for the sidelink communication operation and an order of priority of transmission timing synchronization states to be assumed by the first UE for the sidelink communication operation.

11. The apparatus of claim 10, wherein the apparatus is further configured to obtain an indication of resources for the sidelink communication operation of the first UE, and
    wherein the apparatus is configured to perform at least one of:
       triggering to obtain the indication by initiating a sidelink communication operation resource request; and
       obtaining the indication unrequested.

12. The apparatus of claim 11, wherein the information is determined further based on a mode of resource indication for the sidelink communication operation.

13. The apparatus of claim 10, wherein the first UE is configured to modify at least one of the RRC state and the transmission timing synchronization state in response to obtaining information indicating that the sidelink communication operation of the first UE is not allowed.

14. A method comprising:
    obtaining information indicating whether or not a sidelink communication operation of a first user equipment (UE) is allowed in a coverage area of a base station of a mobile communications network, the information being determined based on a radio resource control (RRC) state of the first UE and a transmission timing synchronization state of the first UE for a sidelink transmission of the first UE to a second UE, wherein the transmission timing synchronization state is defined by at least one timing reference signal that is used by the first UE for synchronization; and
    controlling the first UE according to the information,
    wherein an apparatus is configured to control the first UE according to priority information, the priority information indicating an order of priority of RRC states to be assumed by the first UE for the sidelink communication operation and an order of priority of transmission timing synchronization states to be assumed by the first UE for the sidelink communication operation.

15. The method of claim 14, wherein the method further comprises obtaining an indication of resources for the sidelink communication operation of the first UE, and
wherein the method comprises at least one of:
triggering obtaining the indication by initiating a sidelink communication operation resource request; and
obtaining the indication unrequested.

16. The method of claim 14, wherein the information is determined further based on a mode of resource indication for the sidelink communication operation.

17. The method of claim 14, wherein the method further comprises causing the first UE to modify at least one of the RRC state and the transmission timing synchronization state in response to obtaining information indicating that the sidelink communication operation of the first UE is not allowed.

18. A computer program product comprising a non-transitory computer-readable medium storing computer program code, the computer program code when executed by a processor causing an apparatus to perform the actions of the method of claim 14.

* * * * *